(12) United States Patent
Walter et al.

(10) Patent No.: US 8,316,973 B2
(45) Date of Patent: Nov. 27, 2012

(54) ELECTRIC DRIVING UNIT FOR A VEHICLE

(75) Inventors: Fritz Walter, Raisting (DE); Andreas Heiland, Munich (DE); Fritz Deibel, Paehl (DE); Peter Ehrhart, Munich (DE)

(73) Assignee: L-3 Communications Corporation, Starnberg (DE)

( * ) Notice: Subject to any disclaimer, the term of this patent is extended or adjusted under 35 U.S.C. 154(b) by 0 days.

(21) Appl. No.: 12/715,982

(22) Filed: Mar. 2, 2010

(65) Prior Publication Data

US 2010/0300782 A1    Dec. 2, 2010

Related U.S. Application Data

(63) Continuation of application No. 10/569,096, filed as application No. PCT/EP2004/009229 on Aug. 17, 2004, now abandoned.

(30) Foreign Application Priority Data

Aug. 22, 2003  (DE) .................................. 103 38 659

(51) Int. Cl.
*B60K 7/00* (2006.01)
(52) U.S. Cl. .................................................. 180/65.51
(58) Field of Classification Search ............... 180/65.51, 180/65.6, 65.7; 903/951, 952; 152/514, 152/399, DIG. 10; 310/67 R, 83, 93
See application file for complete search history.

(56) References Cited

U.S. PATENT DOCUMENTS

| 3,812,928 | A | | 5/1974 | Ringland et al. |
| 4,165,777 | A | * | 8/1979 | Sano ............................. 152/411 |
| 4,989,657 | A | * | 2/1991 | Lipper ........................ 152/399 |
| 5,127,485 | A | * | 7/1992 | Wakuta et al. ............. 180/65.51 |
| 5,156,579 | A | * | 10/1992 | Wakuta et al. ............... 475/161 |
| 5,973,463 | A | * | 10/1999 | Okuda et al. .................. 318/430 |
| 6,107,761 | A | * | 8/2000 | Seto et al. ..................... 318/139 |
| 6,752,227 | B1 | * | 6/2004 | Bachmann ................. 180/65.51 |
| 6,942,049 | B2 | * | 9/2005 | Shimizu ...................... 180/65.6 |
| 2005/0140230 | A1 | * | 6/2005 | Johnson et al. ............... 310/112 |

FOREIGN PATENT DOCUMENTS

DE           197 48 201        3/1999

OTHER PUBLICATIONS

International Search Report of PCT/EP2004/009229 dated Dec. 22, 2004.

* cited by examiner

*Primary Examiner* — John Walters
(74) *Attorney, Agent, or Firm* — Brinks Hofer Gilson & Lione

(57) ABSTRACT

An electric drive unit for a motor vehicle includes an electric motor having a stator that is fixed with respect to a stub axle and a rotor that is rotatably supported with respect to the stub axle. A gear system has its input connected to the rotor for torque transmission. A wheel carrier is connected to the output of the gear system for torque transmission. A first bearing of the wheel carrier is provide on a first axial side of the electric motor facing away from the gear system. A second bearing of the wheel carrier is provided either on the first axial side of the electric motor, or in the gear system, realized in the form of a bearing of a rotatable gear system part connected to the wheel carrier.

64 Claims, 4 Drawing Sheets

ELECTRIC DRIVING UNIT FOR A VEHICLE

The present application is a continuation of U.S. application Ser. No. 10/569,096, filed on Feb. 20, 2007, which is the U.S. National Stage of International Application No. PCT/EP2004/009229, filed Aug. 17, 2004, which in turn claims priority to German Application No. 103 38 659.9, filed on Aug. 22, 2003, the priority of which is claimed. The entire content of each of the foregoing applications is expressly incorporated herein by reference.

Subject matter of the invention is an electric drive unit for a motor vehicle, comprising:
(a) a stub axle;
(b) an electric motor having a stator that is fixed with respect to the stub axle and having a rotor that is rotatably supported with respect to the stub axle;
(c) a gear system having its input connected to the rotor for torque transmission;
(d) a wheel carrier connected to the output of the gear system for torque transmission; characterized in
(e) that there is provided a first bearing of the wheel carrier on a first axial side of the electric motor facing away from the gear system;
(f) and that there is provided a second bearing of the wheel carrier
   either on the first axial side of the electric motor as well
   or in the gear system, realized in the form of a bearing of a rotatable gear system part connected (directly or indirectly) to the wheel carrier.

Electric drive units for motor vehicles are already known. As examples of electrically driven motor vehicles, the following may be indicated: scooter-like motor vehicles for standing on; scooter-like motor vehicles for sitting on; small vehicles, in particular for airports and golf courts; motor vehicles of the type of passenger motor vehicles produced in millions of numbers, i.e. having typically one to seven seats and a roof; mini-busses and busses; trucks. The electric drive unit according to the invention is suitable in particular for all of these kinds of motor vehicles. For reasons that will still become clearer further below, the electric drive unit according to the invention is suited in particularly good manner for applications in which high driving torques or high driving powers for the motor vehicle are to be provided and for large/heavy motor vehicles. Examples in this regard are trucks and, in more general form, heavy transport vehicles. To be named as particularly suited vehicles are motor vehicles in which more than one or two motor vehicle wheels are driven by a respective electric drive unit, e.g. large/heavy transport vehicles with four or more driven wheels. Although the electric drive unit according to the invention has been developed primarily for installation in non-railbound motor vehicles, it may also be put to advantage for railbound vehicles.

In case of electrically driven motor vehicles, the question arising is how the required electrical energy can be fed to the motor vehicle. In particular, the following possibilities are known: an accumulator from which electrical energy for the drive unit can be withdrawn (e.g. a scooter with accumulator); generation of electrical energy on board of the vehicle (e.g. combustion engine with current generator on board of the vehicle; fuel cell stack on board of the vehicle); transfer of electrical energy from outside into the motor vehicle (e.g. bus with current collector from an overhead line; railbound vehicle with current collector form an overhead line). The electric drive unit according to the invention is suited in particular for all of these types of electric energy connection.

It is emphasized that it is indeed preferred in the scope of the invention to combine the drive unit with a motor vehicle wheel performing a rolling motion on the ground or a rolling path. However, this does not necessarily have to be so. Rather, the wheel carrier may issue its torque finally desired for driving the motor vehicle, to any component related with the drive of the motor vehicle. All of this will become still clearer further below by way of concrete examples. Anyway, the term "wheel carrier" is not to be understood in a restrictive sense as a "carrier for a wheel rolling on the ground or a rolling path".

There are known electric drive units for motor vehicles in which an electric motor and a gear system are combined. In this regard, there are embodiments in the prior art in which the gear system is a planetary gear system.

It is the object of the invention to make available an electric drive unit for a motor vehicle, in which the electric motor and the gear system are combined in so favorable manner that there are advantages arising in terms of the space required and/or in terms of mounting/unmounting.

In the electric drive unit according to the invention it is provided, according to a first alternative, that the support of the wheel carrier is concentrated on the axial side of the electric motor directed away from the gear system. As a consequence thereof, there are optimum prerequisites provided for axially mounting the electric motor and the gear system one after the other on the stub axle, permitting extremely simple unmounting in the opposite direction and sequence, in particular in case of repair and maintenance works. The second alternative according to the invention provides for savings in supporting expenditure and space requirements. With a skilled design, there are similarly good mounting and unmounting conditions achieved as outlined above in connection with the first alternative. Preferably, the drive unit can be designed such that gear system and electric motor may be unmounted also without removal of the vehicle wheel, i.e. without jack-lifting of the vehicle.

In the electric drive unit according to the invention, the gear system preferably is a planetary gear system comprising a sun wheel, planet wheels, a planet carrier and a ring gear. The planetary gear system preferably has stepped planet wheels. A multi-stage planetary gear system is possible as well. Planetary gear systems provide for the advantage that high torques can be transmitted with comparatively little space required and that high stepping up/down relationships can be attained. In case of the invention, the stepping ratios preferably are from higher speed to lower speed, corresponding to stepping ratios from lower torque to higher torque.

In the drive unit according to the invention, the electric motor and the gear system preferably are arranged coaxially beside each other.

The afore-mentioned bearing of a rotatable gear system part preferably is a bearing of the planet carrier. Looking at a planetary gear system with power take-off from the planet carrier, the planet carrier is joined to the wheel carrier anyway. Besides, the planet carrier is supported for its rotary motion anyway so that one bearing is basically saved. It is preferred in this regard to introduce the radial wheel loads from the wheel carrier via the planet carrier and the afore-mentioned bearing of the gear system part into the stub axle and to design this bearing in accordance with the overall forces.

In case of the second alternative of the invention, it is preferred to provide a common lubricant for the gear system and said bearing of a rotatable gear system part. Such lubricant preferably is transmission oil.

Due to the close combination of electric motor and gear system according to the invention, it is well possible and preferred that the rotor of the electric motor and the input of the gear system are joined to each other without an intermediate compensating member. The support of the rotor and the support at the input of the gear system are coupled in terms of support on the stub axle so that an intermediate compensating member for compensating tolerances can be dispensed with here.

The wheel carrier preferably is designed in axially split manner. It is thus possible to leave a first axial part of the wheel carrier on the gear system when unmounting the same from the drive unit. This provides for better accessibility to the other component parts of the drive unit.

Preferably, the gear system is designed to be unmounted from the drive unit in the form of a module (and, in assembly, to be mounted as a module). This unmountability in the form of a module also is to cover the case that a smaller remainder of the gear system (at first) remains on the drive unit when the main part of the gear system is unmounted. The module unmountability facilitates maintenance and repair works. The gear system in its entirety can be replaced rapidly and easily. Upon unmounting of the gear system, the electric motor is rapidly and readily accessible. Preferably, the gear system module can be unmounted together with one wheel carrier part.

The main part of the rotor of the electric motor, upon release from its supporting portion, preferably is adapted to be unmounted from the drive unit in axial direction. The stator of the electric motor preferably is adapted to be unmounted from the drive unit in axial direction. The preferred unmounting possibilities "vice versa" provide for preferred mounting possibilities. The preferred unmounting and mounting possibilities, respectively, of the electric motor, so to speak in two component parts, without the necessity of unmounting the support proper of the rotor, results in convenient and rapid unmounting and mounting of the electric motor for maintenance and repair works. As an alternative, it is preferred to provide for the possibility of unmounting the electric motor in its entirety from the stub axle and mounting the electric motor in its entirety to the stub axle, respectively.

Preferably, the first bearing of the wheel carrier has at least part of its axial length positioned within the axial length of the electric motor, i.e. shifted into the region of the electric motor. Due to this measure, axial space is saved as regards the entire drive unit.

Preferably, an end portion of the wheel carrier is positioned in an annular space surrounding the gear system. In this manner, there is good access possible from outside to the end portion of the wheel carrier. It is preferred to have a face end of the wheel carrier arranged within the axial dimension of the gear system. It is particularly expedient when said face end of the wheel carrier is set back with respect to the end of the axial dimension of the gear system, at best to such an extent that a component (in particular a tire rim or a chain wheel) to be driven by the wheel carrier may be attached there, without mounting parts projecting beyond the axial length of the gear system.

The wheel carrier preferably has a tire rim, in particular a standard rim, attached thereto. The tire rim may have a tire mounted thereon. One now is confronted with a more complete drive unit consisting in essence of wheel carrier, rim, tire, electric motor and gear system. It is preferred that this more complete wheel drive unit or the drive unit according to the invention described hereinbefore can be unmounted from, and mounted to, the vehicle in the form of an overall unit. Preferably, use is made of a vehicle rim that is axially split into two parts, with the splitting thereof being preferably effected nearer to the side facing the vehicle center, i.e. such that the axially narrower lateral ring of the rim is arranged on the rim inside.

It is emphasized that the term "wheel carrier" is not to be understood restrictively to the effect that the same, in operation, cogently has to be provided with a vehicle wheel performing a rolling motion on the ground or a prepared path. As a further preferred possibility, a chain wheel is cited driving e.g. a caterpillar track of a caterpillar vehicle, e.g. in case of an earth mover. An additional alternative is the attachment of a gear wheel on the wheel carrier which, e.g. in case of a cogwheel railway, may cooperate with a stationary toothed rack or, e.g. via rotary intermediate parts, may work on the driving wheel of a motor vehicle.

It is possible to provide the gear system either on the side of the electric motor more remote from the vehicle center when the drive unit is in use, or on the other side of the electric motor. The first-mentioned alternative is preferred since, as a rule, it leads to more convenient attachment of the stator of the electric motor to the stub axle.

The side of the wheel carrier directed away from the gear system preferably is provided with a brake means, with the rotatable part of the brake means (typically brake disc or brake drum) being joined to the wheel carrier directly or indirectly via intermediate parts. One now has a complete drive unit comprising also a brake means, in addition to wheel carrier, electric motor, gear system, optionally wheel rim, optionally tire.

It is possible in many embodiments of the invention to rigidly couple the output of the gear system and the wheel carrier. However, there are embodiments in which it makes sense to provide a coupling between gear system output and wheel carrier that compensates relative motions. These are in particular such embodiments in which both bearings of the wheel carrier are provided on one side of the gear system on the stub axle, as relative motions between gear system and wheel carrier arise here more easily due to the principle employed or since it is more likely in general that, due to manufacturing processes, minor mis-positioning results in the relation between gear system output and the coupling region of the wheel carrier to the gear system.

Couplings compensating relative motions may be preferably a curved teeth coupling or an elastic mechanical coupling or a torque transmission tube fixed on one side and having a tolerance-compensating toothing arrangement.

In accordance with a preferred development of the invention, a releasable connection is provided in the torque transmission path between the electric motor and the gear system. Practical use of a motor vehicle equipped with at least one drive unit according to the invention is considerably facilitated when, in particular for towing the vehicle with the aid of another vehicle or for continuing the ride in case of a defective electric motor, the gear system indeed rotates along, without however the rotor of the electric motor cogently rotating as well. The releasable connection does not need to be located in front of the input of the gear system in the strict sense. It may also be located between two gear system components. However, it is expedient if it is arranged at least close to the gear system input, where torque increase has not yet taken place. In terms of design, it is preferred to provide the releasable connection radially inside of the support of the rotatable gear system part connected to the wheel carrier.

It is altogether preferred to incorporate the releasable connection into the gear system. It is preferred that the releasable connection is designed to be releasable from the outside. The releasable connection may be provided such that it may be released while the vehicle is stopped; however, it is particularly expedient to design the releasable connection such that it is releasable while the vehicle is in motion.

According to a preferred development of the invention, there is provided a plug system for connecting the electric motor electrically and in terms of cooling. This is the preferred alternative with respect to a connection by means of lines—which is possible as well in the scope of the invention—that cannot be mated and unmated by means of plugs. The electrical connection involves the supply of electrical energy for the driving motor function, optionally the discharge of electrical energy (when the electric motor is utilized in a braking function as well), in many cases electric control connections (in particular when an electronic control of the electric motor is arranged within the vehicle), and in many cases electrical connections to sensors in the region of the drive unit. The connection in terms of cooling, as a rule, involves a line or a line path for cooling fluid (liquid or gaseous) for cooling the electric motor. In addition to the connections mentioned, there may preferably be provided additional connections that are established via the plug system. In this context, reference is to be made in particular to connecting lines for a wheel pressure regulating system and/or a rotational speed sensor on the wheel side, moreover a connection in terms of cooling for the transmission oil. The possibility of a line for venting the gear system or for operating the releasable connection between gear system should be mentioned as well.

As regards the lines between the drive unit and the remainder of the vehicle (i.e. normally the vehicle interior), there are two philosophies possible: on the one hand, the philosophy of combination, so as to arrive at a common enclosure for all lines between the drive unit and the remainder of the vehicle, and on the other hand the philosophy of splitting the lines, to a larger or lesser extent, to several line strands. In case of the first philosophy, mounting and unmounting are particularly simple; in the event of defects, however, usually the entire, united line strand has to be replaced. In case of the second philosophy, the mounting expenditure indeed is somewhat higher, but there are thinner and more flexible line strands involved, permitting more freedom in conductor or line strand routing. When a plurality of line strands is present, it is preferred to provide separated line strand routing schemes on or in different parts of the wheel suspension of the vehicle wheel concerned. In this regard, the parts of the wheel suspension, which possibly are dimensioned differently, may be used in corresponding manner for line strand routing. According to a development of the invention, it is possible to provide the lines in partly redundant manner, so that, in case of failure of one of several line strands, there is still available a sufficient number of operative stator windings, sufficient cooling etc., be it for a reduced motor power.

Making use of one common line strand for all lines does not cogently mean that the plug system consists of one single, matable pair of plug units, although this is one of the technically feasible possibilities. However, it is possible as well to provide several pairs of matable plug units, e.g. one or more pairs of electric plug units and one or more pairs of fluid-type plug units. In case of several line strands, there may be provided one pair of plug units for each line strand; however, this is not cogent, but other distributions and combinations of the pairs of plug units are possible as well. Reference is made to the following preferred features of the plug system or plug units, respectively: one or more foremost guide pins, floating arrangement in particular of smaller contact pins (e.g. for sensor connections) on common carrier, self-sealing couplings for liquid and, optionally, pressurized air.

The electric motor of the drive unit preferably may be operated as a brake, thus operating in a generator mode. The electric motor or motors of all drive units of the motor vehicle (together) may constitute the main service brake of the motor vehicle. The mechanical brake means mentioned further above may be the main service brake or a supporting service brake in addition to the electric motors, or just a parking and/or emergency brake.

The electric motor preferably is designed with permanent-magnetic excitation on the rotor. Such electric motors can be designed with particularly high power density, which is very advantageous in the light of the space conditions in case of the drive unit according to the invention. The electric motor preferably is formed with an external rotor. Such motors can be built with particularly high power density and with particularly high torque, as measured in relation to volume or weight. These features constitute good prerequisites for integration in the drive unit according to the invention.

A further subject matter of the invention is a wheel drive unit for a motor vehicle, comprising:

(a) an electric drive unit as disclosed in the present application;

(b) and a motor vehicle wheel mounted on the wheel carrier of the drive unit.

This wheel drive unit is a component which can be unmounted from the motor vehicle and mounted to the motor vehicle in the form of a unit. In addition to the mechanical attachment, merely the electrical connections and the connections in terms of cooling need to be established, in particular by a plug system.

Preferably the drive unit, if desired except for a partial region of the stub axle component on the vehicle side, and preferably inclusive of a brake disk or a brake drum, is accommodated substantially within the axial dimension of the motor vehicle wheel. Or in other words: the thus defined drive unit is substantially not wider in axial direction than the motor vehicle wheel and in essence does not project axially beyond the wheel on any of the two wheel sides.

The wheel drive unit preferably has at least one mounting portion where it is adapted to be mounted on a wheel suspension of the motor vehicle. This may be connecting locations for suspension-arm-like components of the wheel suspension, but also a design of the stub axle component in the form of a component of the type of a steering knuckle, so that the entire wheel drive unit may be pivoted for steering the motor vehicle.

Still another subject matter of the invention is a motor vehicle comprising at least one drive unit as disclosed in the present application or at least one wheel drive unit as disclosed in the present application.

The motor vehicle equipped with the drive unit according to the invention or with the more complete wheel drive unit according to the invention, may be a motor vehicle in which steering of the wheels of one axle only is possible. However, it may also be a vehicle in which steering of the wheels of two axles or of the wheels of still more axles is possible. It may also be a vehicle in which steering of the wheels of all axles is possible.

The invention and preferred developments of the invention will be described in more detail hereinafter by way of embodiments illustrated in the drawings, in which FIG. 1 shows an axial longitudinal sectional view of a first embodiment of a wheel drive unit;

Figure 1:
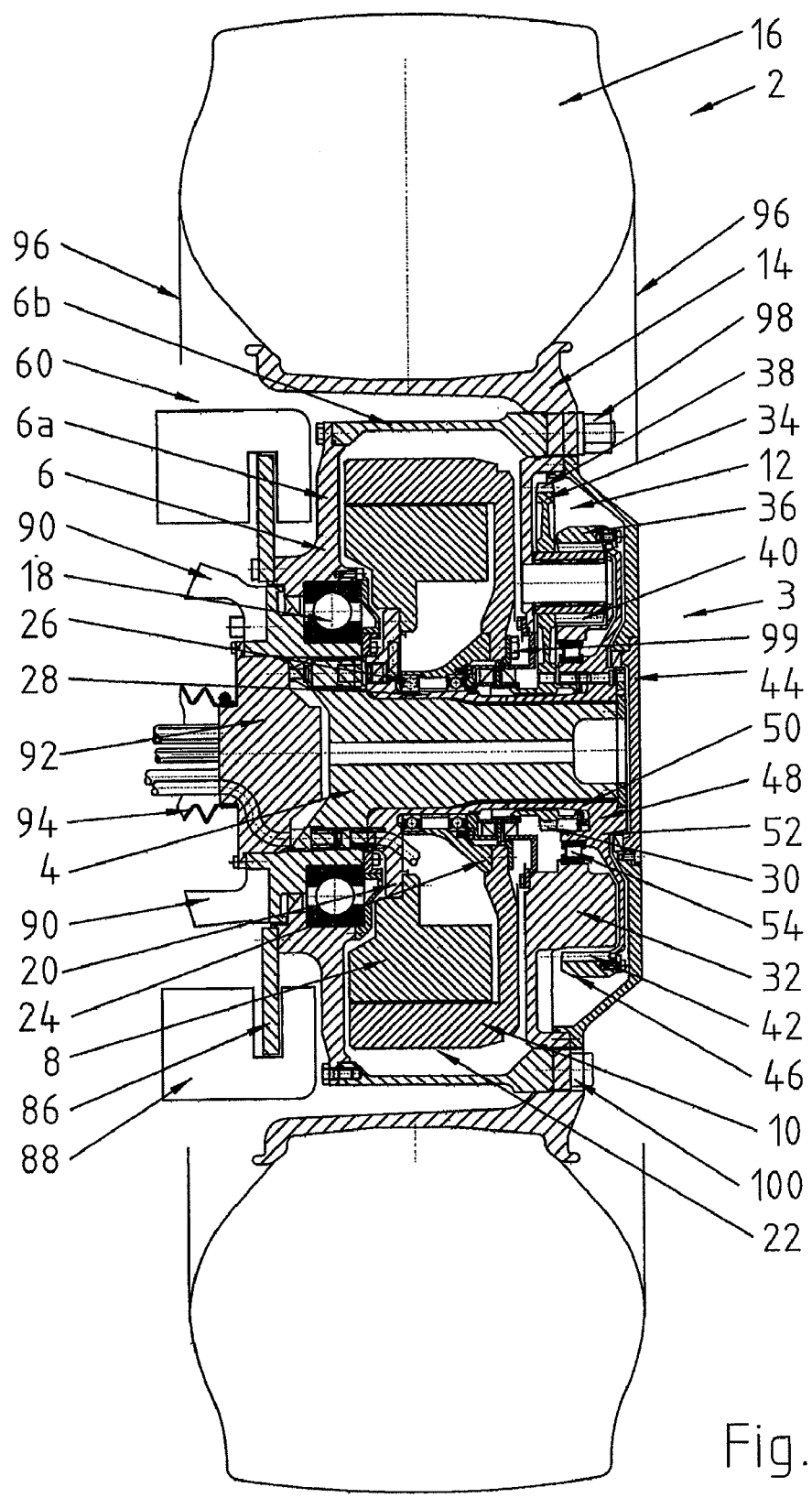

The wheel drive unit 2 illustrated in drawing FIG. 1 contains the following main components:

stub axle component 4, wheel carrier 6,
stator 8 of an electric motor 22,
rotor 10 of electric motor 22,
gear system 12 in the form of a planetary gear system,
wheel rim 14,
tire 16,
brake means 60.

By removing the wheel rim 14 along with the tire 16 from the thus described wheel drive unit 2, one arrives at a drive unit 3 according to the invention, comprising the main components wheel carrier 6, electric motor 22, gear system 12, brake disc 86.

The stub axle component 4, which will be briefly referred to as stub axle 4 in the following, is of larger diameter in its left-hand portion in FIG. 1 and of smaller diameter in its right-hand, axially longer portion. On the larger diameter portion, there is arranged a first bearing 18 of the wheel carrier 6, which in the present embodiment is a ball bearing.

The wheel carrier 6 in its entirety—roughly speaking—is cup-shaped and consists of a—roughly speaking—disc-shaped first part 6a and a substantially cylindrical part 6b.

At the diameter transition from larger diameter portion of stub axle 4 to the smaller diameter portion, the stub axle 4 has a mounting ring 20 attached thereto. The mounting ring 20 has the stator 8 of the electric motor 22 attached thereto. On its left-hand end face in FIG. 1, the stator 8, except for the radially outer portion of the same, is axially somewhat recessed, so that the first bearing 18 of the wheel carrier 6 extends a certain distance into the axial dimension of the electric motor 22.

The rotor 10 of the electric motor 22 is cup-shaped, with the cup being open towards the left-hand side in FIG. 1 and the central portion having threadedly mounted thereon a sleeve-shaped lug 24 projecting towards the left. Two axially spaced ball bearings 26 of the rotor 10 are positioned between a sleeve-like extension 28 of mounting ring 20—radially inside—and the lug 24—radially outside.

The design of the torque-transmitting connection between rotor 10 and gear system 12 will not yet be described here. The gear system 12, in the instant case in the form of a one-stage planetary gear system, adjoins the electric motor 22 on the right-hand side in FIG. 1. The gear system 12 comprises as main component parts of the same a rotatably driven sun wheel 30, a rotatably supported planet carrier 32, a plurality of circumferentially distributed planet wheels 34 arranged in the planet carrier 32 for rotation of their own, as well as an internally toothed ring gear 36 fixed on the stub axle 4 in non-rotatable manner. The sun wheel 30 meshes with a first toothed portion 38 of the respective planet wheel 34. Axially beside the first toothed portion 38, each planet wheel 34 has a second toothed portion 40 on a smaller diameter, which meshes with the inner toothed portion 42 of ring gear 36, so that a stepped planet wheel is formed. The transmission output of the gear system 12 is the planet carrier 32 which, in the region of the outer circumference of the same, is threadedly attached to the, in FIG. 1, rightwardly directed end face of the cylindrical part 6b of wheel carrier 6. Towards the right in FIG. 1, the gear system 12 and thus the entire drive unit 3 is confined by a two-part cover 44.

The ring gear 36 consists in essence of an annular internally toothed portion 46 and a main body 48—threadedly attached thereto—having a substantially cylindrical central portion 50 and a middle portion 52 extending from the central portion radially towards the outside. Central portion 50 is positioned on stub axle 4 and fixed there so as to be non-rotatable. Planet carrier 32 is rotatably supported, by means of a bearing 54—in the instant case a roller bearing—, on the intermediate portion 52 of ring gear 36. Due to the fact that planet carrier 32 is threadedly attached on its outer circumference to wheel carrier 6, bearing 54 constitutes a second bearing of wheel carrier 6. This bearing 54 thus has the double function of supporting the planet carrier 32 of gear system 12 and of supporting, indirectly, also the wheel carrier 6, in extremely space-saving manner within gear system 12. The first bearing 18 and the second bearing 54 of the wheel carrier 6 are spaced from each other by a desirably large axial distance.

The torque-transmitting connection between the rotor 10 of the electric motor 22 and the transmission input of the gear system 12 will be described now by way of FIG. 2. Rotor 10 has a central bore 62 which is of somewhat larger diameter than the right-hand portion of stub axle 4. In this region, rotor 10 has a ring 64 threadedly attached thereto which projects radially towards the inside. In the inner bore thereof, ring 64 is provided with an axially extending multi-groove toothed portion 66. In addition thereto, a sleeve-like toothed ring 68 can be seen having an externally toothed portion 70 in a region located slightly towards the right from the center. This externally toothed portion 70 meshes with the toothed portions 38 of the several planet wheels 34 so that the toothed ring 68 constitutes the sun wheel of the planetary gear system 12. In the left-hand end portion in FIG. 2, the toothed ring 68 has an external multi-groove toothed portion 72. This external multi-groove toothed portion 72 is fitted into the already described inner multi-groove toothed portion 66 of ring 64. It is to be understood that the multi-groove toothed portions 66 and 72 are worked in such exact and mutually matching manner that good centering of the toothed ring 68 in rotor 10 is ensured.

In the following, a description will be given as to how the afore-described torque-transmitting connection between rotor 10 and gear system 12 can be released or canceled. The toothed ring 68, in the right-hand end portion of the same in FIG. 2, has an outer peripheral groove in which a split ring 74 (not visible in the drawing) engages from the outside. Distributed over its circumference, ring 74 has a plurality of threaded bores, with a threaded bolt 76 extending through each thereof. When all bolts 76 are rotated simultaneously, ring 74 is displaced, in the manner of a traveling nut, in axial direction of the drive unit 3, towards the left in FIG. 2. In doing so, ring 74 entrains toothed ring 68 towards the left, with the toothed ring 68 being able without any problem to shift towards the left because of the pair of multi-groove toothed portions 66 and 72. This shifting or displacement motion continues until toothed portion 70 of toothed ring 68 is disengaged from the respective toothed portion 38 of the respective planet wheel 34. In this state, the torque transmission from the sun wheel of the planetary gear system 12 to the planet wheels 34 of gear system 12 is interrupted. By rotating the threaded bolts 76 in the opposite direction, engagement between the sun wheel and the planet wheels 34 can be restored. The possibility of releasing or interrupting the torque-transmitting connection between electric motor 22 and gear system 12 is advantageous when the motor vehicle equipped with one or more wheel drive units 1 according to the invention is to be towed or when the electric motor 22 of one of several wheel drive units 2 is defective, while however driving of the vehicle is to be continued using the electric motor 22 of at least one other wheel drive unit 2.

It is emphasized that, in spite of the simple mechanical design described, using threaded bolts 76, it is also possible to provide for more highly mechanized solutions. As an example, the provision of a hydraulic or pneumatic ring piston is to be indicated, which acts on the toothed ring 68. Such a solution, as well as other possible solutions, may easily be provided such that release of the torque-transmitting connection between electric motor 22 and gear system 12 is possible without any unmounting work and even while the vehicle is in motion. The hydraulic liquid or the pressurized air for effecting opening/closing of the torque-transmitting connection may take place by means of lines in the interior of the stub axle 4, making a bend radially towards the outside on the right-hand face end in FIG. 2.

Figure 2:
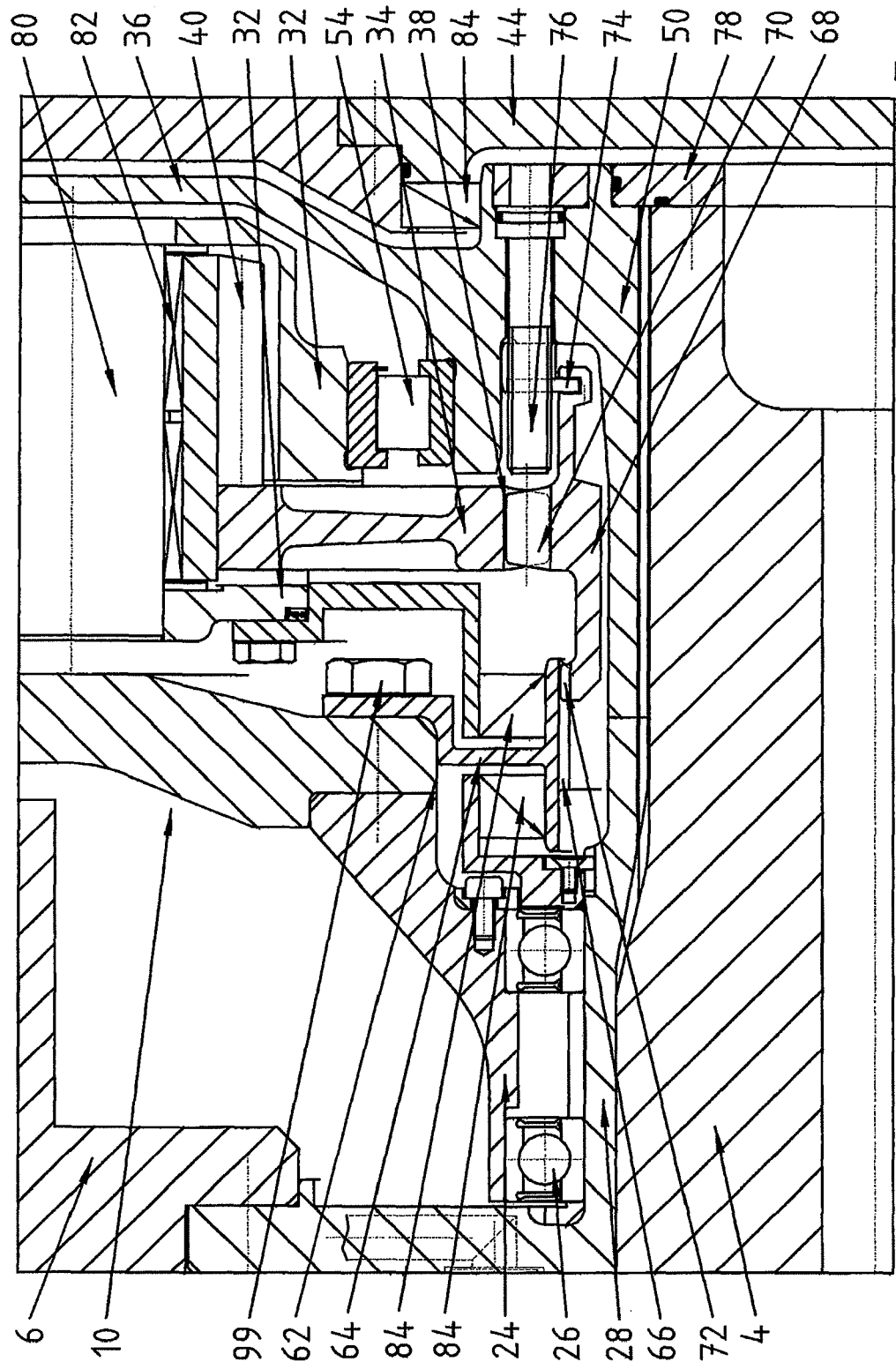
FIG. 2 shows a cutout of FIG. 1 in an enlarged scale.

FIG. 2 clearly reveals furthermore the cylindrical central portion 50 of ring gear 36 as well as the second bearing 54. Ring gear 36 is clamped axially against the extension 28 of the mounting ring 20 for the stator 8 of the electric motor 22, by means of a pressing ring 78 threadedly attached to the right-hand face end of stub axle 4. Ring gear 36, pressing ring 78 and extension 28 are all fixed to stub axle 4 in non-rotatable manner.

Furthermore, FIG. 2 clearly shows how a supporting bolt 80 for a planet wheel 34 (there are several supporting bolts 80 and planet wheels 34 distributed over the circumference) is mounted in the planet carrier 32 in non-rotatable and axially non-displaceable manner. The supporting bolt 80 has the respective planet wheel 34 rotatably mounted thereon by means of needle bearings 82. The toothed portion 40 of planet wheel 34 meshes with the internally toothed portion 42 of ring gear 36.

In the inside, the gear system 12 is filled with transmission oil. Shaft seals 84 provide for sealing of the gear system 12 on the left-hand end and on the right-hand end.

Returning to FIG. 1, the brake means 60 will be described in more detail now. In the present embodiment, brake means 60 comprises a brake disc 86 threadedly attached, from the left, to a mounting face of the wheel carrier 6, as well as a plurality of brake calipers 88 distributed over the circumference of the brake disc 86. The brake calipers 88 contain brake pistons and brake pads (not shown). There may be provided hydraulically, pneumatically and electrically operated brakes.

Finally, FIG. 1 shows wheel suspension parts 90 by means of which the entire wheel drive unit 2 is attached to a vehicle in an operative state. The wheel suspension parts 90 are threadedly attached to one or more leftwardly directed mounting faces of the stub axle component 4.

Finally, FIG. 1 reveals a plug unit 92 located centrally and coaxially in a face-side recess of the stub axle 4 on the left-hand side of the same. Plug unit 92 has, on a diameter in circumferentially distributed manner, a plurality of electric plug pins (in particular for supplying electrical energy to the windings of stator 8, for transmitting signals between drive unit 3 and vehicle, e.g. rotary position sensor of the electric motor 22, sensors for temperatures inside electric motor 22 and inside gear system 12, sensor for tire pressure, speed sensor for anti-blocking system of brake device 60), as well as a plurality of plug-pin-like hollow connection pieces for carrying a fluid (in particular cooling water or cooling oil for stator 8, transmission oil cooling). The counter or mating elements for all plug pins are provided on the supporting ring 20 and project from there through corresponding openings in the stub axle component 4 towards the left in FIG. 1. In the solution illustrated, there is only one plug unit 92. As an alternative, a plurality of plug units 92 could be utilized.

As an alternative, the counter or mating elements mentioned could be positioned on the stub axle component 4. Another modification consists in positioning said plug pins on the supporting ring 20 or the stub axle 4, and positioning said counter elements on "plug unit" 92. It is also possible to arrange part of the plug pins on plug unit 92 (and to then mount the counter elements for these plug pins on the supporting ring 20 or the stub axle) and to arrange the remainder of the plug pins on the supporting ring 20 or the stub axle 4 (arranging the counter elements for these plug pins on "plug unit" 92). Finally, a modification is to be mentioned in which an intermediate plug unit is positioned on the stub axle component 4 (leftwardly directed: only plug pins or in part plug pins and in part sockets or only sockets; rightwardly directed: only plug pins or in part plug pins and in part sockets or only sockets), with the respective appropriate counter elements being provided on the left-hand side on the plug unit 92, and the respective appropriate counter elements being provided on the right-hand side on the supporting ring 20.

FIG. 1 shows furthermore that all necessary lines (for current, signals, liquids, optionally gases) extend from plug unit 92 in the form of a common line strand in a common enclosure 94, typically into the interior of the motor vehicle having the wheel drive unit 2 mounted thereto. The line strand, along with the enclosure 94, is flexible so that the wheel drive unit 2 may perform steering motions, motions due to vehicle springs and optionally additional motions in relation to the remainder of the vehicle. As an alternative, it is possible to distribute the lines to several line strands.

FIG. 1 shows that the left-hand outside of the left-hand limit of tire 16 and the right-hand outside of the right-hand limit of tire 16 mark the axial width of the wheel drive unit 2 in its entirety (cf. confining lines 96). The wheel carrier 6, the brake disc 86 (however, not the brake calipers 88 in their entirety), the electric motor 22 and the gear system 12 are located substantially within this axial dimension 96-96.

The, in FIG. 1, right-hand side of the wheel drive unit 2 is directed away from the center of the motor vehicle and the, in FIG. 1, left-hand side of the wheel drive unit 2 is directed towards the center of the motor vehicle to which the wheel drive unit 2 is to be, or is, mounted.

By releasing the bolts 98 or nuts, the rim 14 together with the tire 16 may be removed from the wheel drive unit towards the right-hand side, completely analogous to a conventional motor vehicle with mechanically driven wheel. The screw heads or nuts 98 are also located within the axial width 96-96. Upon unmounting of the rim 14 along with the tire 16, the entire gear system 12 can be unmounted. To this end, it is merely necessary to remove the cover 44 and to remove the pressing ring 78 as well as bolts 100 between the planet carrier 32 and the wheel carrier 6; the entire gear system 12 may then be pulled out axially towards the right, thus moving toothed ring 68 out of the ring 64. The second bearing 54 is removed along with the gear system 12. In unmounting the gear system 12 it is possible either to remove the cylindrical part 6b of wheel carrier 6 or not to remove the same along therewith. With corresponding load dimensioning of the bearing 18, the gear system 12 may also be unmounted without prior removal of the rim 14 towards the right.

As an alternative, the rim 14 can also be unmounted together with the gear system 12.

Upon unmounting of the gear system 12, the electric motor 12, inclusive of its mounting ring 20 with extension 28 from stub axle 4, may now be axially pulled out towards the right in FIG. 1. The plug-type connections with plug 92 are separated automatically in doing so.

In case the main components of the electric motor 22, rotor 10 and stator 8, are to be unmounted separately, merely bolts 99 have to be released first. The main part of rotor 10 then may be pulled out axially, with the supporting portion with lug 24 remaining in the wheel drive unit 2. However, if desired, it is also possible to remove the stator 8 towards the right, upon release of its threaded attachment to mounting ring 20; the inner diameter of the stator is dimensioned such that it can be moved past lug 24.

It is possible for maintenance and repair works to remove the plug unit 92 from the wheel drive unit 2 towards the left.

With respect to the embodiment illustrated in FIG. 3, only those differences from the embodiment of FIGS. 1 and 2 will be explained that are of greater relevance to the invention. The same reference numerals as before will be used for analogous component parts.

Figure 3:
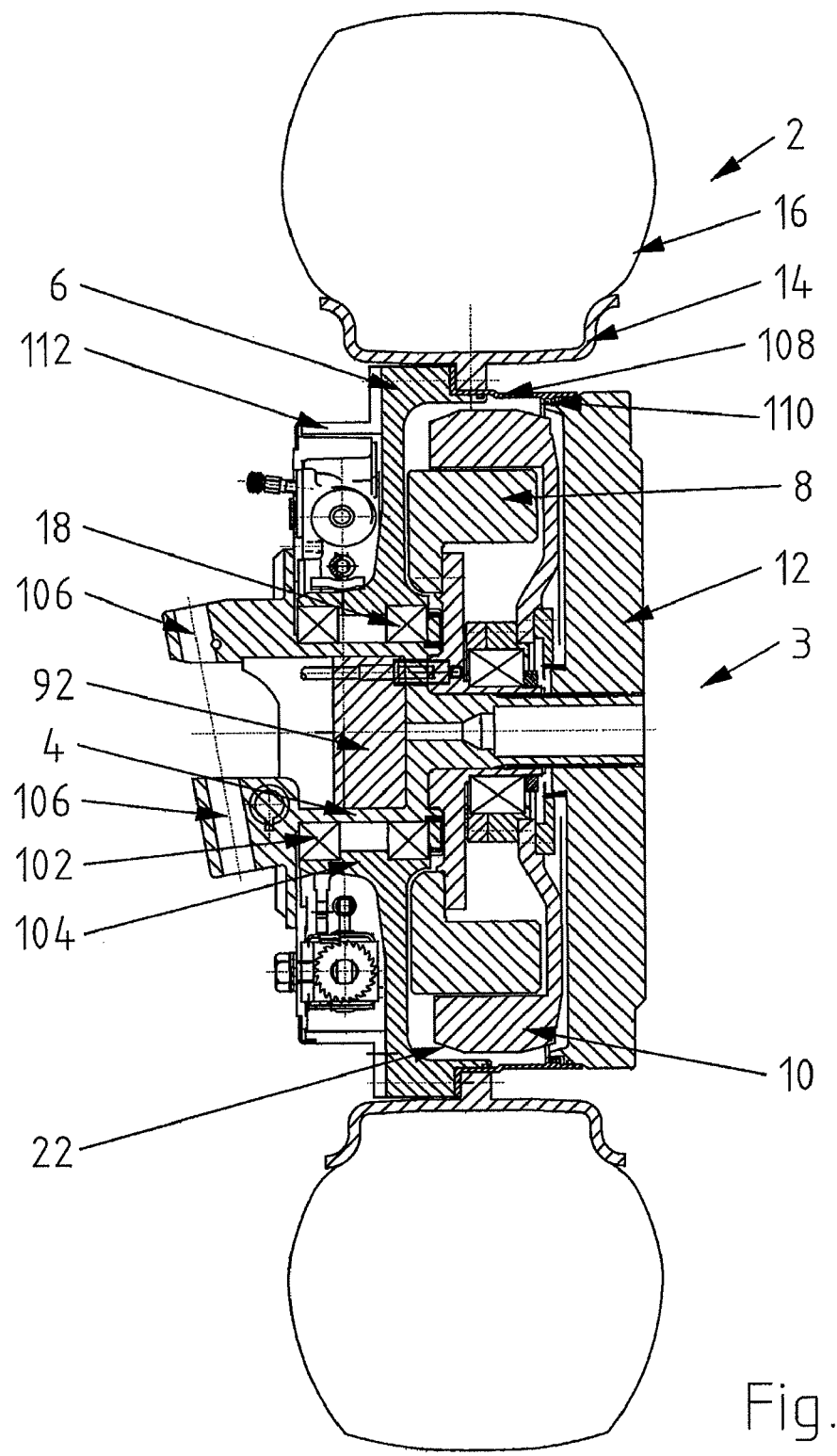
FIG. 3 shows an axial longitudinal sectional view of a second embodiment of a wheel drive unit.

The wheel carrier 6 now is supported on the stub axle component 4 with a first bearing 18 and a second bearing 102, with both bearings 18 and 102 being provided in FIG. 3 on the left-hand side of electric motor 22. Or in other words: the central hub 104 of wheel carrier 6 is axially widened towards the left and now offers space for both bearings 18 and 102; there is no right-hand side second support of the wheel carrier 6 within the gear system 12.

The stub axle component 4 is integrally extended towards the left and presents there two mutually aligned bores 106 for attaching the wheel drive unit 2 to the motor vehicle. This may be in the form of a pivotal mounting for steering system pivotal motions.

The electric motor 22 is substantially of analogous design to the first embodiment. The gear system 12, as in case of the first embodiment, is a one-stage planetary gear system illustrated in schematic outline only. The gear system 12 substantially is of analogous design to the first embodiment; however, scarcer dimensioning in particular of bearing 54 may be chosen as the gear system 12 does not have to dissipate supporting forces for wheel carrier 6.

For torque transmission from the gear system 12 to wheel carrier 6 and to wheel rim 14, respectively, there is provided a relatively thin-walled tube 108. Torque transmission from gear system 12 to tube 108 is effected by a toothed portion 110 of such design that relative motions between gear system or transmission output and wheel carrier 6 can be compensated.

It is emphasized that the gear system 12 does not necessarily have to be designed with transmission output from the planet carrier 32. As an alternative, it is also possible to employ a transmission output from ring gear 36 and a fixed planet carrier 32. This holds for all embodiments.

In the second embodiment, wheel carrier 6 is not split axially. The connection between wheel carrier 6 and rim 14 is located approximately in the axial middle of the wheel drive unit 2. It is to be understood that sufficient space has to be present between the tube 108 and the outer periphery of gear system 12 in order to access mounting bolts of wheel rim 14.

Instead of the brake disc 86, the second embodiment has a brake drum 112 secured to wheel carrier 6. Operation of the brake pads in brake drum 112 is effected hydraulically or pneumatically or electrically.

In each of the embodiments illustrated, the electric motor 22 is provided with an external rotor 10 having permanent magnets of alternating polarity (not shown) on its cylinder face directed towards the inside. The stator 8 is provided with poles (not shown) having windings thereon on its outer circumferential face. The air gap of electric motor 22 is cylindrical. The electric motor 22 is electronically commutated. The electronics system arranged within the vehicle and feeding electric motor 22 is designed to switch the electric motor 22 to generator-mode of operation so that the same operates as a brake. The electrical energy thus generated may either be fed back to a current line or may be supplied to an accumulator or may be converted to heat in brake resistors.

Figure 4:
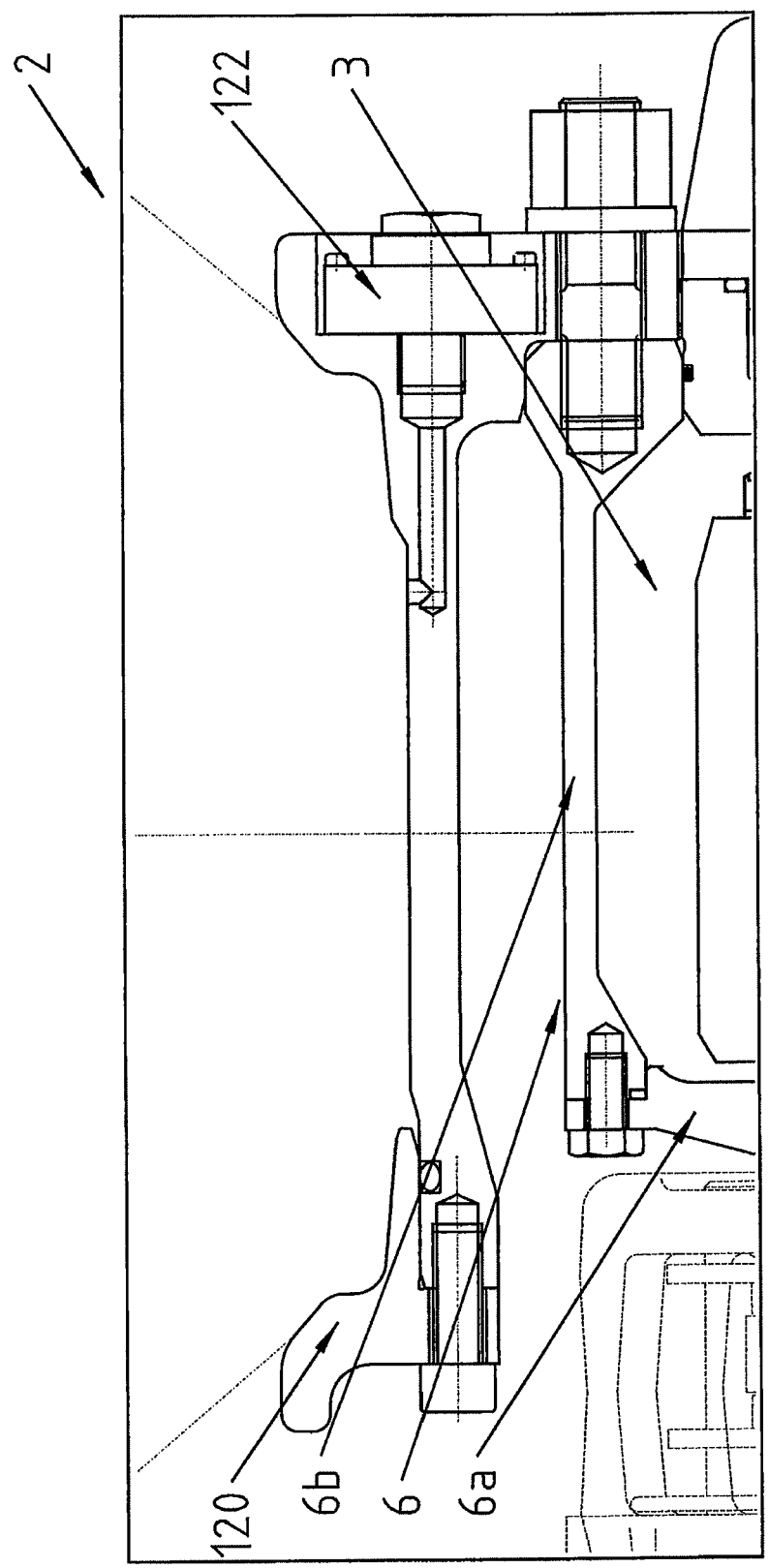
FIG. 4 shows an axial sectional view of a bipartite tire rim.

FIG. 4 illustrates the axially bipartite design of rim 14 with the axially narrower lateral ring 120 being closer to the vehicle center. In addition thereto, the drawing also shows parts of the tire pressure regulating system 122 arranged on the outside.

The invention claimed is:

1. An electric drive unit for a motor vehicle, the drive unit having a first side comprising at least one mounting portion for attaching the drive unit to the motor vehicle, and an opposite second side, the drive unit comprising:
    (a) a non-rotating stub axle;
    (b) an electric motor having a first axial side and an opposite second axial side facing away from the at least one mounting portion of the drive unit, the electric motor having a stator that is fixed with respect to the stub axle and having a rotor that is rotatably supported with respect to the stub axle;
    (c) a gear system having an input and an output, the rotor of the electric motor being connected to the input of the gear system for torque transmission, the first axial side of the electric motor facing away from the gear system;
    (d) a rotatable wheel carrier connected to the output of the gear system for torque transmission; and
    (e) a first bearing and a second bearing of the wheel carrier, which are provided on the first axial side of the electric motor.

2. The drive unit according to claim 1, wherein the gear system is a planetary gear system having a sun wheel, planet wheels, a planet carrier and a ring gear.

3. The drive unit of claim 2, wherein said bearing of a rotatable gear system part is a bearing of the planet carrier.

4. The drive unit of claim 2, wherein the planetary gear system is a planetary gear system with stepped planet wheels.

5. The drive unit of claim 1, wherein the rotor of the electric motor and the input of the gear system are connected to each other without intermediate compensating member.

6. The drive unit of claim 1, wherein the wheel carrier is of axially split design.

7. The drive unit of claim 1, wherein the gear system is adapted to be unmounted from the drive unit in the form of a gear system module.

8. The drive unit of claim 7, wherein the gear system module is adapted to be unmounted together with a wheel carrier part.

9. The drive unit of claim 1, wherein the main part of the rotor of the electric motor, upon release thereof from its supporting portion, is adapted to be unmounted from the drive unit in axial direction.

10. The drive unit of claim 1, wherein the stator of the electric motor is adapted to be unmounted from the drive unit in axial direction.

11. The drive unit of claim 1, wherein the first bearing of the wheel carrier is positioned with at least part of its axial length within the axial length of the electric motor.

12. The drive unit of claim 1, wherein an end portion of the wheel carrier is positioned in an annular space surrounding the gear system.

13. The drive unit of claim 1, wherein a face end of the wheel carrier is located within the axial dimension of the gear system.

14. The drive unit of claim 1, wherein the wheel carrier has a tire rim attached thereto.

15. The drive unit of claim 14, wherein the tire rim is of bipartite design.

16. The drive unit of claim 1, wherein a brake disc or a brake drum is provided on the side of the wheel carrier facing away from the gear system.

17. The drive unit of claim 1, wherein between the output of the gear system and the wheel carrier there is provided a coupling compensating relative movements.

18. The drive unit of claim 17, wherein the coupling is a curved teeth coupling.

19. The drive unit according to claim 17, wherein the coupling is an elastic mechanical coupling.

20. The drive unit of claim 17, wherein the coupling is a torque-transmitting tube.

21. The drive unit of claim 1, wherein a releasable connection is provided in the torque-transmitting path between the electric motor and the gear system.

22. The drive unit of claim 21, wherein the releasable connection is integrated in the gear system.

23. The drive unit of claim 1, wherein there is provided a plug system for connecting the electric motor electrically and in terms of cooling.

24. The drive unit according to claim 23, wherein the plug system contains at least one additional connection.

25. The drive unit of claim 1, further comprising all lines between the drive unit and the remainder of the vehicle, wherein all of said lines extend in a common, flexible enclosure.

26. The drive unit of claim 1, wherein the electric motor is adapted to be operated as a brake.

27. The drive unit of claim 1, further comprising a brake associated therewith that is designed as a parking brake.

28. The drive unit of claim 1, wherein the electric motor is designed with permanent-magnetic excitation on the rotor.

29. The drive unit of claim 1, wherein the electric motor is designed with an external rotor.

30. A wheel drive unit for a motor vehicle, comprising:
(a) an electric drive unit of claim 1; and
(b) a motor vehicle wheel attached to the wheel carrier of the drive unit.

31. The wheel drive unit of claim 30, wherein the drive unit, except for a partial region of the stub axle component on the vehicle side, is accommodated substantially within the axial dimension of the motor vehicle wheel.

32. A motor vehicle comprising at least one electric drive unit of claim 1.

33. An electric drive unit for a motor vehicle, the drive unit comprising:
(a) a stub axle;
(b) an electric motor having a first axial side and an opposite second axial side, the electric motor having a stator that is fixed with respect to the stub axle and having a rotor that is rotatably supported with respect to the stub axle;
(c) a gear system having an input and a rotatable output part, the rotor of the electric motor being connected to the input of the gear system for torque transmission, the first axial side of the electric motor facing away from the gear system;
(d) a wheel carrier connected to the rotatable output part of the gear system for torque transmission; and
(e) a first bearing of the wheel carrier provided on the first axial side of the electric motor; and
(f) a second bearing of the wheel carrier provided in the gear system and being at the same time a bearing of the rotatable output part of the gear system.

34. The drive unit according to claim 33, wherein the gear system is a planetary gear system having a sun wheel, planet wheels, a planet carrier and a ring gear.

35. The drive unit of claim 34, wherein said bearing of a rotatable gear system part is a bearing of the planet carrier.

36. The drive unit of claim 34, wherein the planetary gear system is a planetary gear system with stepped planet wheels.

37. The drive unit of claim 33, wherein the rotor of the electric motor and the input of the gear system are connected to each other without intermediate compensating member.

38. The drive unit of claim 33, wherein the wheel carrier is of axially split design.

39. The drive unit of claim 33, wherein the gear system is adapted to be unmounted from the drive unit in the form of a gear system module.

40. The drive unit of claim 39, wherein the gear system module is adapted to be unmounted together with a wheel carrier part.

41. The drive unit of claim 33, wherein the main part of the rotor of the electric motor, upon release thereof from its supporting portion, is adapted to be unmounted from the drive unit in axial direction.

42. The drive unit of claim 33, wherein the stator of the electric motor is adapted to be unmounted from the drive unit in axial direction.

43. The drive unit of claim 33, wherein the first bearing of the wheel carrier is positioned with at least part of its axial length within the axial length of the electric motor.

44. The drive unit of claim 33, wherein an end portion of the wheel carrier is positioned in an annular space surrounding the gear system.

45. The drive unit of claim 33, wherein a face end of the wheel carrier is located within the axial dimension of the gear system.

46. The drive unit of claim 33, wherein the wheel carrier has a tire rim attached thereto.

47. The drive unit of claim 46, wherein the tire rim is of bipartite design.

48. The drive unit of claim 33, wherein a brake disc or a brake drum is provided on the side of the wheel carrier facing away from the gear system.

49. The drive unit of claim 33, wherein between the output of the gear system and the wheel carrier there is provided a coupling compensating relative movements.

50. The drive unit of claim 49, wherein the coupling is a curved teeth coupling.

51. The drive unit according to claim 49, wherein the coupling is an elastic mechanical coupling.

52. The drive unit of claim 49, wherein the coupling is a torque-transmitting tube.

53. The drive unit of claim 33, wherein a releasable connection is provided in the torque-transmitting path between the electric motor and the gear system.

54. The drive unit of claim 53, wherein the releasable connection is integrated in the gear system.

55. The drive unit of claim 33, further comprising a plug system for connecting the electric motor electrically and in terms of cooling.

56. The drive unit according to claim 55, wherein the plug system contains at least one additional connection.

57. The drive unit of claim 33, further comprising all lines between the drive unit and the remainder of the vehicle, wherein all of said lines extend in a common, flexible enclosure.

58. The drive unit of claim 33, wherein the electric motor is adapted to be operated as a brake.

59. The drive unit of claim 33, further comprising a brake associated therewith that is designed as a parking brake.

60. The drive unit of claim 33, wherein the electric motor is designed with permanent-magnetic excitation on the rotor.

61. The drive unit of claim 33, wherein the electric motor is designed with an external rotor.

62. A wheel drive unit for a motor vehicle, comprising:
(a) an electric drive unit of claim 33; and
(b) and a motor vehicle wheel attached to the wheel carrier of the drive unit.

63. The wheel drive unit of claim 62, wherein the drive unit, except for a partial region of the stub axle component on the vehicle side, is accommodated substantially within the axial dimension of the motor vehicle wheel.

64. A motor vehicle comprising at least one electric drive unit of claim 33.

* * * * *